Jan. 20, 1925.　　　　　　　　　　1,523,637
W. R. FOX
POWER PRESS
Filed Feb. 7, 1924　　　3 Sheets-Sheet 2

Inventor:
William R. Fox,

Jan. 20, 1925.  1,523,637
W. R. FOX
POWER PRESS
Filed Feb. 7, 1924   3 Sheets-Sheet 3

Inventor:
William R. Fox,
by Spear, Middleton, Donaldson & Hall
Attys.

Patented Jan. 20, 1925.

1,523,637

UNITED STATES PATENT OFFICE.

WILLIAM R. FOX, OF JACKSON, MICHIGAN, ASSIGNOR TO FOX MACHINE COMPANY, OF JACKSON, MICHIGAN, A CORPORATION OF MICHIGAN.

POWER PRESS.

Application filed February 7, 1924. Serial No. 691,280.

*To all whom it may concern:*

Be it known that I, WILLIAM R. Fox, a citizen of the United States, and resident of Jackson, in the county of Jackson and State of Michigan, have invented certain new and useful Improvements in Power Presses, of which the following is a specification.

The invention concerns a power press having a non-rotary reciprocatory ram operated by planetary gearing under control of the operator to impart different degrees of power to the ram according to the work to be done.

Fig. 3 is a sectional view of the head of the 10 ton press on line $x$—$x$ of Fig. 2, the gearing train being laid out flat on said line $x$—$x$ Fig. 2 for convenience of illustration.

Fig. 4 is a side elevation of a portion of the head of a 10 ton press shown in Fig. 1 with the cover removed showing the brake drums, the brake bands and a portion of the planetary gears.

Figure 1:
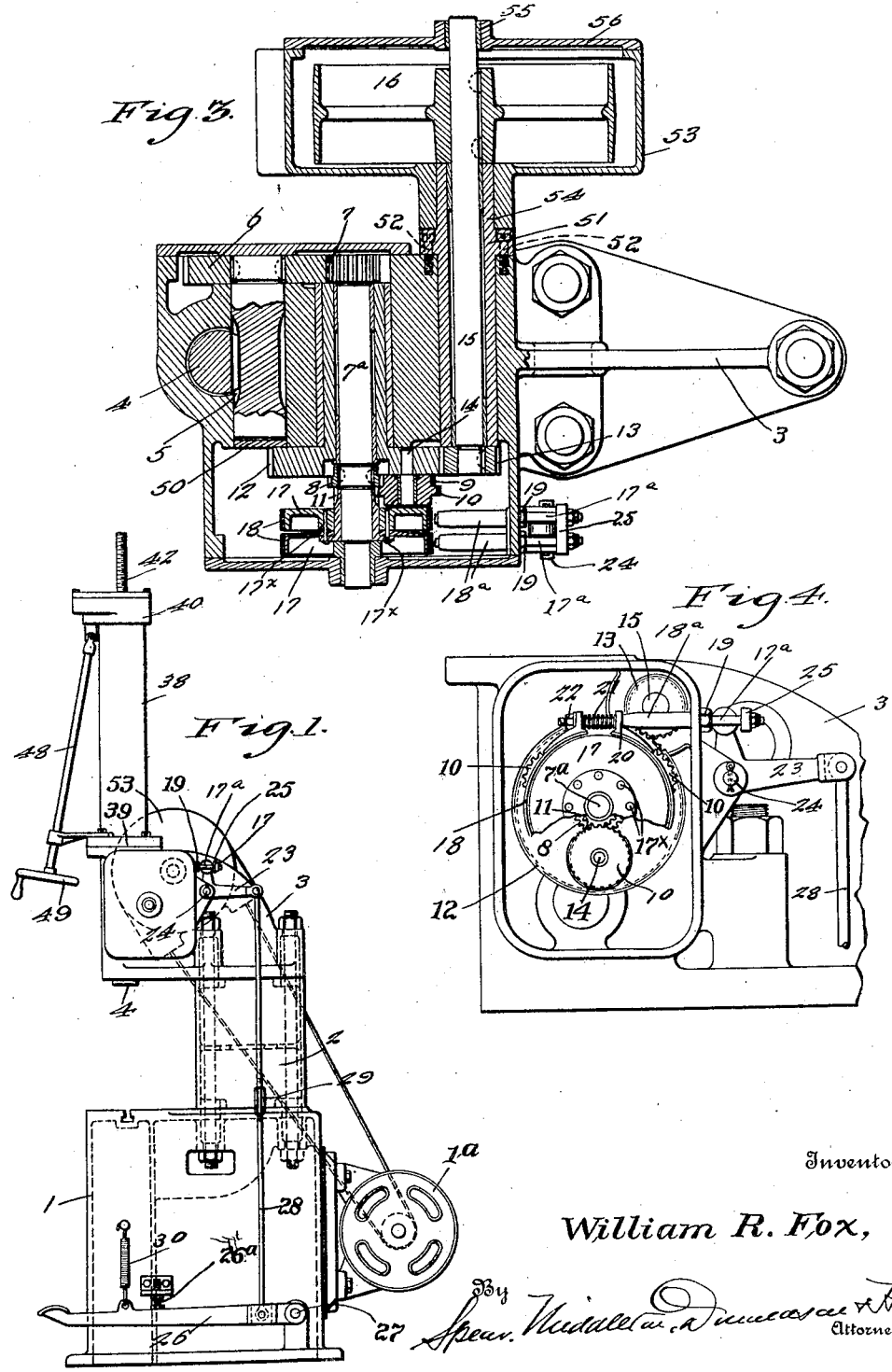
Figure 1 is a side elevation of a 5 ton press.
Figure 2:
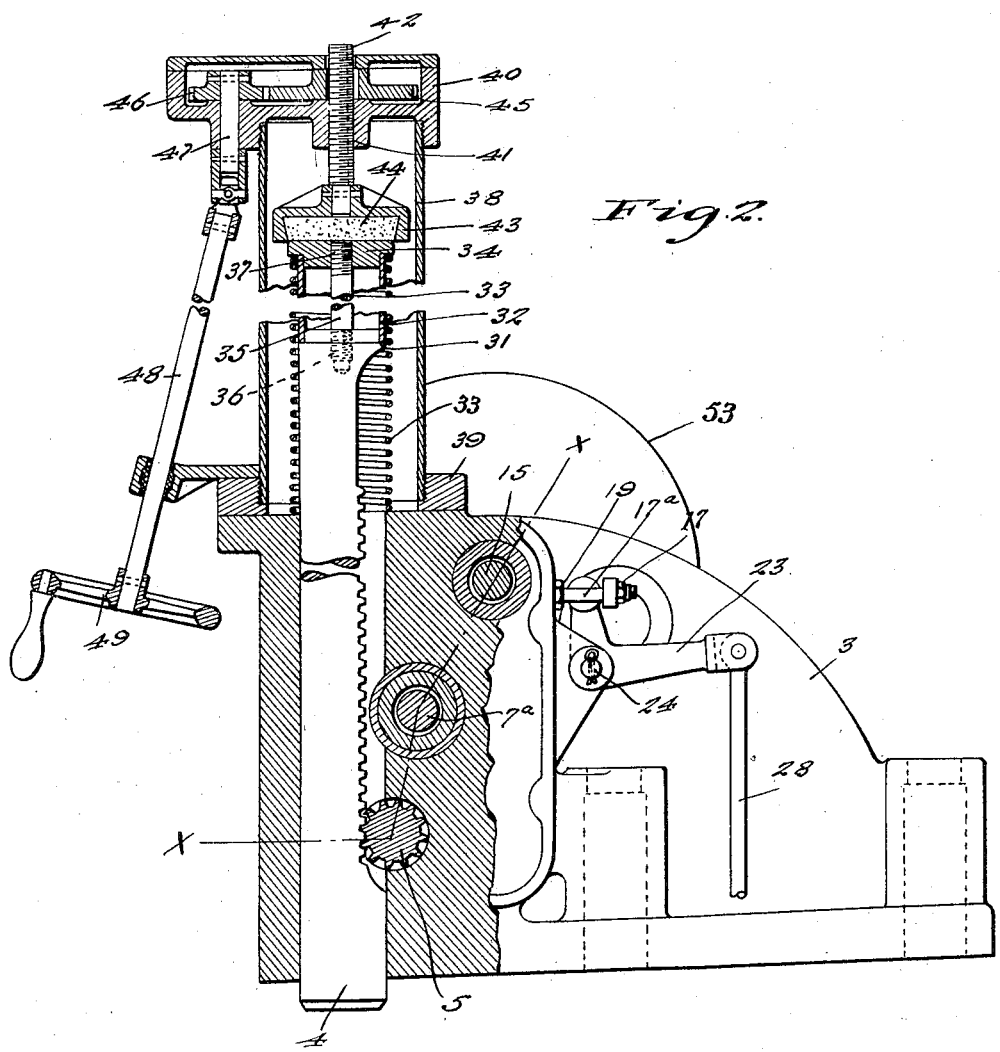
Fig. 2 is a part side elevation and part sectional of the head of a 10 ton press as shown on Fig. 1 with a portion of the ram shown in section.
Figure 5:
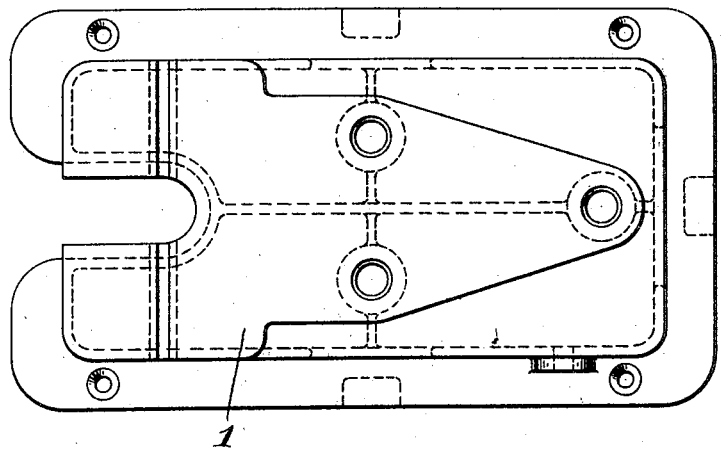

Fig. 5, the base of a 10 ton press.

Figure 6:
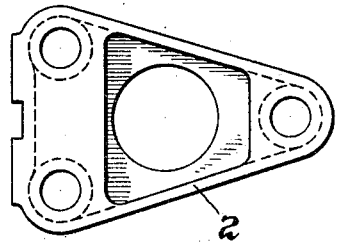

Fig. 6, the column of a 10 ton press.

Figure 7:
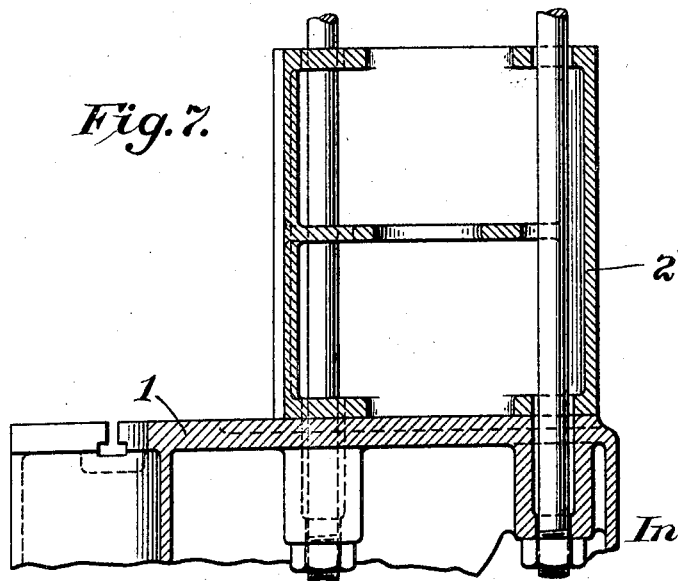

Fig. 7 is a central vertical section of the base and column.

Referring to the different figures, 1 is the base, 2 the column, 3 the head, 4 the ram, in which are cut the rack teeth, 5 is the rack pinion which carries the rack pinion gear 6. This is driven by the pinion 7 on shaft $7^a$. Keyed to shaft $7^a$ is the driven gear 8. This gear is driven by the planetary gear 9 of which there are three sets. Secured to planetary gear 9 is the driving planetary gear 10. These gears are either riveted together or preferably made of one piece and are carried on the three studs (14) one only of which is shown in Fig. 3 and one in Fig. 4. In the latter figure, however, the three gears 10 are indicated.

These studs are riveted into the bull gear wheel 12 and of course revolve with it. The bull gear 12 is driven by the pinion 13 which is carried by the drive shaft 15 that is driven by the pulley 16. Means are provided to impart motion from the bull gear wheel 12, through the planetaries and gear 8 to the shaft $7^a$ and thence through the pinion 7, gear 6, and pinion 5 to the ram 4 and this means is under control of the operator so that more or less of the bull wheel's motion will be imparted to the ram. For this purpose a drum 17, of which there may be one or more, is mounted to turn freely on an extension of the shaft $7^a$ to which the gear 8 is keyed.

If there are two or more drums they are fastened together in any suitable way as by the pins $17^x$. This drum 17 has gear teeth 11 formed on its hub portion with which hub gear the planetary gear section 10 meshes.

There may be, as stated, one or more brake drums 17 and bands 18. In the five ton press there is one, in the 10 ton press there are two.

These brake bands are compressed each by a rod $17^a$. These rods pass through the hollow studs $18^a$ which are secured to the casing by the nuts 19. The ends of these studs $18^a$ support one side of the brake band at 20, Fig. 4. The rods $17^a$ support springs 21 which force the brake band apart. The ends of the rods $17^a$ are threaded into the nuts 22 which serve to draw the brake bands together.

A bell crank lever 23 is pivoted at 24 and its upper end contacts with the plate 25 through which the rods $17^a$ pass.

A foot treadle 26 is fulcrumed at 27. The connecting rod 28 connects it with the bell crank 23. There is a turn buckle 29 which adjusts the length of this connecting rod and a spring 30 which holds it in the upward position, an adjustable stop $26^a$ limits the upward movement of the treadle.

The ram 4 has teeth cut on a sufficient portion of its length to give it the necessary travel. On the upper end of the ram there is a shoulder turned at 31. Over this shoulder is fitted a piece of pipe 32. A spring 33 is carried on the outside of the pipe 32. This spring at its lower end presses on the top of the head 3 and on the upper end contacts against a shouldered nut plate 34. A bolt 35 has its lower end screwed into the top of ram at 36 and its upper end screwed into the flanged nut at 37. This holds the spring under sufficient compression to overcome the weight of the ram and the friction of the gearing so that when the ram is released at the bottom of the stroke it moves quickly to the highest position allowed.

A large diameter pipe 38 is threaded into the plate 39 which plate is screwed onto the top of the head 3.

Onto the top of the pipe 38 is screwed a cap 40. This cap is threaded at 41 to fit a splined screw 42. This screw at its lower end is pinned securely to a large disc 43 which has a recess in its lower face which is filled with a rubber bumper 44.

The cap 40 carries within it a gear and pinion 45, 46. The gear 45 is splined to and turns the screw 42. This gear is driven by the pinion 46 which is pinned to the shaft 47 which is connected by universal joint to the hand wheel shaft 48 so that by turning the hand wheel 49 the rubber bumper or stop is raised or lowered which limits the upward travel of the ram.

As the chamber surrounding the planetary gears is filled with oil, it is necessary to prevent the oil from running out through the bearing around the pinion shaft 5. It is necessary, therefore, to close the end of the bearing in which the shaft 5 revolves. This is done by placing a cap 50 tight in the opening which prevents the oil from passing out around this shaft.

*Motor drive.*—A motor 1ª is attached to the base of the machine at the rear. The belt from this motor drives up to the pulley 16.

The shaft 15 of pulley 16 revolves in bearings which are carried in the sleeve 51. This sleeve is pressed into the head casing and is secured at 52 by bolts which screw into the frame and are countersunk into the flange at this point.

The pulley guard 53 is carried on the extension of the sleeve 51 at 54. It is held adjustably on this extension so that it can be revolved to permit the opening for the belt to come in desired position, the opening being in the direction of the motor for a motor drive or directly overhead for a drive from an overhead shaft.

The outside bearing 55 is carried in the plate 56 which is secured to the outside of the pulley guard.

*Supporting column.*—As will be observed from Fig. 6 the column 2 is triangular in form and the bolts which secure the three parts 1, 2, and 3 together pass below the top of the base far enough to come below the trussed section which gives the necessary strength at the base and a similar construction where the bolts pass through the head, these bolts being expanded by heat when they are put into position so that when they shrink they tie the three parts together in almost a solid unit and at the same time reduce the cost of construction and admit of different lengths of columns to accommodate different varieties of work.

In the operation of the machine when it is running idle, the gear 13 revolves the bull wheel 12 there being no friction on the drum 17. Both the planetary gears 9, 10 and the brake drums revolve with the gear 12 and the planetaries 9, 10, simply roll around the gear 8 without driving it, but as soon as there is friction applied to the brake drums holding the hub gear 11 from revolving, then the planetary gears 9 and 10 revolve around the hub gear 11 and while making one complete revolution the gear 9 being smaller in diameter than the gear 10, it will only revolve the gear 8 and the shaft 7ª ⅓ of a revolution while the gear 12 makes a complete revolution. This will be made plainer by noting the number of teeth in the different gears.

The hub or brake drum gear 11 has 18 teeth. This drives the planetary driving gear 10 which has 36 teeth. To this is attached the driven planetary gear 9 which has 27 teeth. This in turn drives the driven gear 8 on shaft 7 which has 27 teeth. It will be observed therefore, that when the brake drums are stationary, that the bull gear 12 in making 150 revolutions will only drive the driven gear 8 and the shaft 7, 50 revolutions.

By this system of gearing we get a reduction of 27 to 1, from the pulley to the rack pinion shaft as follows: The gear 13 has 24 teeth, the gear 12, 72 teeth. This is a ratio of 3 to 1.

The ratio in the differential planetary gears as explained is 3 to 1. The pinion 7 has 15 teeth and the gear 6 45 teeth, a ratio of 3 to 1. Consequently the ratio reduction is 27 to 1 with the yielding pressure as described.

When a shaft is to be straightened or a bushing to be forced into place or a piece to be broached, the pressure applied to the foot lever stops the rotation of the brake drums and the ram immediately descends until it contacts with the work to be performed. If the pressure is light, the ram travels at the fixed speed until the foot lever is released, or the drums slip under the brake bands. If the pressure required to bend a shaft or to press in a bushing is slight then the operator will ease off on the lever giving just sufficient pressure to accomplish the work. As soon as the foot is raised from the lever, the brake bands are released and the spring forces the ram to its upper position, unless the operator again puts his foot on the treadle and starts the ram moving downward as at first.

In the use of presses for straightening, broaching or pressing in bushings, it is often necessary to hold the pressure at about the maximum capacity or at some pressure less than the maximum capacity of the press and when the pressure is held it is necessary that the brake drums be allowed to slip under the bands. This can be readily accomplished in this press, as they are submerged in oil and the pressure applied to the brake bands to give the necessary pressure to the ram does not cause undue friction or heating when the pressure is so held.

It will be noticed that the power press is generally of C form, that is to say, there is a base, a column set back from the front edge of the base, and a head supported at the top of the column and projecting from the front thereof and overhanging the front portion of the base. This construction enables the press to be used in automobile factories for straightening axles, cam shafts, and crank shafts, or other work pieces which are placed above the front portion of the base and in the space between said base and the overhanging portion of the head, where the vertically moving ram can have access thereto and the work piece be properly supported. This press is intended for doing heavy work, for instance, to exert a pressure of five or more tons, and it will be noticed that the column is formed separately from the base and from the head and is of generally triangular cross sectional shape, as shown in Fig. 6. One of its sides is disposed back from the front edge of the base and parallel thereto, and the bolts or tie rods are arranged at the apices of the triangle, the broad front portion of which extends transversely across the base, affording a construction which will afford support of the head and press generally in a direction transverse to said press structure.

What is claimed as new is:

1. In combination in a power press, a non-rotary reciprocatory ram having rack teeth, means for operating said ram, comprising planetary gearing, and means under the control of the operator for controlling differentially the transmission of power from said planetary gearing to the ram, substantially as described.

2. In combination in a power press, a non-rotary ram having rack teeth, a pinion for driving the same axially, a shaft geared to the pinion, a bull gear wheel rotating about said shaft, power means for rotating said wheel, a gear keyed on the shaft, a brake drum arranged coaxially with the shaft and having a hub gear, a planetary gear journalled on the bull gear wheel having teeth engaging the keyed gear and having a second set of teeth engaging the hub gear of the drum, a brake band extending around the brake drum, means under control of the operator for restraining the revolution of the brake drums to varying degrees, by varying the frictional contact of the said brake band with the said drum, to render the planetary more or less effective in rotating the keyed gear, substantially as described.

3. In combination in a power press, a non-rotary reciprocatory ram, having rack teeth, a pinion meshing with the rack, a shaft in driving connection with the pinion, a gear keyed on the shaft, a bull gear wheel rotating freely on the said shaft, a drum free to rotate on an extension of said shaft, a hub gear on said drum, a planetary gear journalled on the bull gear wheel having one set of teeth meshing with the keyed gear and another set of teeth meshing with the hub gear, a brake band with means under the control of the operator for applying more or less frictional resistance to the rotation of the drum with the hub gear, and means driving the bull wheel.

4. In combination in a power press, a non-rotary reciprocatory ram, a head in which said ram is journalled, a pinion mounted in the head and engaging rack teeth on the ram, a shaft also mounted in the said head, gearing between the said shaft and the pinion, a gear keyed on the shaft, a bull gear wheel on a sleeve journalled in said head, a shaft also journalled in the head and having a pinion meshing with the bull wheel, means for driving the said shaft, a brake drum arranged coaxially with the bull gear wheel and having a coaxial hub gear, a planetary on the bull gear wheel having two sets of teeth meshing respectively with the keyed gear and the hub gear, and a brake band with connections to the operator for making said band bear more or less heavily upon the drum to vary its rotation at will, substantially as described.

5. In combination in a power press, a vertically movable ram, a head, gearing for driving the ram, means for controlling in varying degree the transmission of power from said gearing to the vertically movable ram comprising a drum mounted in a chamber in the head and connected to said gearing, a brake band in said chamber engaging the drum, means extending out through the wall of the chamber for enabling the operator to control the frictional resistance applied by the band to the drum, said chamber containing lubricant held from contact with the vertically movable ram.

6. In combination, in a power press, a frame, a vertically movable ram, gearing for moving said ram downwardly, a spring surrounding said ram coaxially, a stop or bumper at the upper end of the ram and substantially co-axial therewith for limiting its upward movement, means for adjusting said stop and means for supporting the adjusting means coaxially above the ram, substantially as described.

7. In combination in a power press, a frame, a vertically movable ram, gearing for moving said ram downwardly, a spring surrounding said ram co-axially, a stop or bumper at the upper end of the ram and substantially co-axial therewith for limiting its upward movement, means for adjusting said stop, a sleeve or tubular casing enclosing the ram, spring, and stop, and supporting the adjusting means, substantially as described.

8. In combination in a power press, a frame, a vertically movable ram, gearing for forcing the ram downwardly, a spring for forcing the ram upwardly, a stop at the upper end, a screw shaft carrying said stop, a nut for said screw, an extension of the frame for holding the nut, gearing for turning the screw to adjust the stop and a connection to the hand of the operator for operating said gearing.

9. In combination in a power press, a reciprocatory ram, gearing for operating the same, a friction drum and band for controlling the transmission of power from said gearing to the ram, a rod connected to one end of the band, a lever connected with the rod, means for adjusting the rod relative to the lever, and means for operating the lever, substantially as described.

10. In combination in a power press, a vertically movable ram, a head in which it is guided, a base, a column between the base and head, said column being a shell of triangular form with one of its sides parallel with and located back from the front portion of the base and back from the line of movement of the ram, said head resting upon the column and projecting therefrom to overlie the front portion of the base, vertical bolts at the apices of the triangular column, said bolts extending up from the base, said base being trussed or ribbed at its upper part.

11. In combination in a power press, a reciprocatory ram, gearing for operating the same, a friction drum and band for controlling the transmission of power from said gearing to the ram, a rod connected to one end of the band, a lever connected with the rod, an adjustable connection between the lever and the foot treadle, and adjustable means for limiting the upward movement of the foot treadle, substantially as described.

In testimony whereof, I affix my signature.

WILLIAM R. FOX.

Witnesses:
  GRACE KEEFER,
  MARIE TUNISON.